United States Patent
Karp et al.

(10) Patent No.: US 9,163,158 B1
(45) Date of Patent: Oct. 20, 2015

(54) WATER BASED FLUID FOR PRODUCING READY TO PRESS DIRECT INKJET IMAGE-ABLE LITHOGRAPHIC PRINTING PLATES

(75) Inventors: Michael Karp, Petah Tikva (IL); Aida Porat, Kibutz Hanita (IL); Sergey Bonder, Haifa (IL); Ehud Shchori, Rehovot (IL)

(73) Assignee: VIM Technologies, Inc., Kibbutz Hanita (IL)

( * ) Notice: Subject to any disclaimer, the term of this patent is extended or adjusted under 35 U.S.C. 154(b) by 282 days.

(21) Appl. No.: 13/603,034

(22) Filed: Sep. 4, 2012

Related U.S. Application Data

(60) Provisional application No. 61/531,006, filed on Sep. 4, 2011.

(51) Int. Cl.
| | |
|---|---|
| *B41M 1/06* | (2006.01) |
| *B41C 1/10* | (2006.01) |
| *C09D 133/08* | (2006.01) |
| *B41J 2/01* | (2006.01) |
| *C09D 133/02* | (2006.01) |
| *C09D 193/02* | (2006.01) |
| *C09D 193/04* | (2006.01) |

(52) U.S. Cl.
CPC ............ *C09D 133/08* (2013.01); *B41C 1/1066* (2013.01); *B41J 2/01* (2013.01); *B41M 1/06* (2013.01); *C09D 133/02* (2013.01); *C09D 193/02* (2013.01); *C09D 193/04* (2013.01)

(58) Field of Classification Search
None
See application file for complete search history.

(56) References Cited

U.S. PATENT DOCUMENTS

| | | | |
|---|---|---|---|
| 4,833,486 A | 5/1989 | Zerillo | |
| 5,312,654 A | 5/1994 | Arimatsu et al. | |
| 5,495,803 A | 3/1996 | Gerber et al. | |
| 5,511,477 A | 4/1996 | Adler et al. | |
| 5,738,013 A | 4/1998 | Kellett | |
| 5,820,932 A | 10/1998 | Hallman et al. | |
| 6,184,267 B1 | 2/2001 | Kato et al. | |
| 6,455,132 B1 | 9/2002 | Aurenty et al. | |
| 6,758,140 B1 | 7/2004 | Szumla et al. | |
| 7,044,053 B2 | 5/2006 | Figov et al. | |
| 8,062,720 B1 | 11/2011 | Porat et al. | |
| 2004/0051768 A1 | 3/2004 | DeBoer et al. | |
| 2006/0223006 A1 | 10/2006 | Shimada et al. | |
| 2008/0193685 A1* | 8/2008 | Aoshima | 428/32.12 |

FOREIGN PATENT DOCUMENTS

| | | |
|---|---|---|
| EP | 1 157 825 A1 | 11/2001 |
| JP | 56-105960 | 8/1981 |

* cited by examiner

*Primary Examiner* — Joshua D Zimmerman
(74) *Attorney, Agent, or Firm* — Morgan, Lewis & Bockius LLP

(57) ABSTRACT

A water based fluid that can be utilized in a standard inkjet printer to image a lithographic printing plate. The water based fluid may include a polymer that is soluble in an alkaline aqueous media and that is resistant to neutral or acidic aqueous media. In addition, the water based fluid may include a sufficient volume of water soluble material to raise the pH level higher than 8. Further, the water based fluid may include a sufficient volume of humectant co-solvents to prevent the nozzles of an inkjet printer from drying out. The water based fluid may be used to image a lithographic plate that include an inkjet ink accepting hydrophilic layer hydrophilic properties. Various embodiments of the water based fluid advantageously allow a plate to be imaged, and then without baking or adding other chemical treatments, the plate can be immediately used for printing.

19 Claims, 1 Drawing Sheet

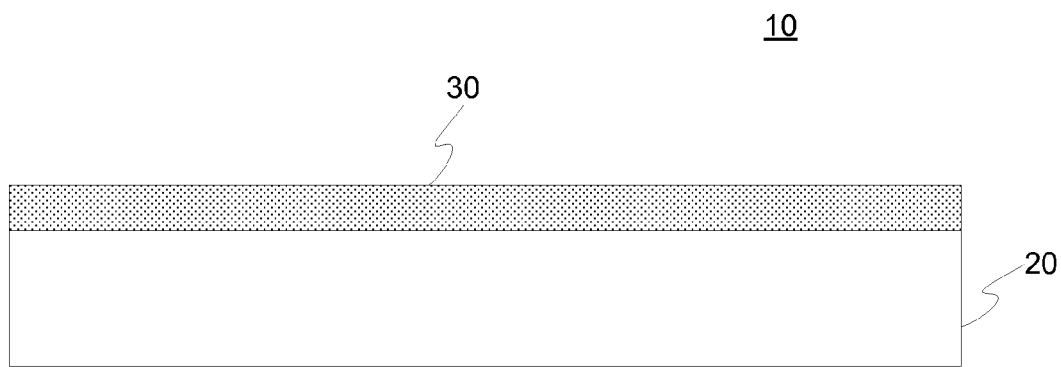

WATER BASED FLUID FOR PRODUCING READY TO PRESS DIRECT INKJET IMAGE-ABLE LITHOGRAPHIC PRINTING PLATES

CROSS-REFERENCE TO RELATED APPLICATIONS

This application is being filed in the United States Patent Office under 35 USC 111(a) and 37 CFR 1.53(b) and, claims the benefit under 35 USC 119(e)(1) of the provisional application for patent that was filed in the United States Patent Office on Sep. 4, 2011 and assigned Ser. No. 61/531,006, which provisional application lists the same inventors as this application and the present application is filed during the pendency of the provisional application. Provisional patent application 61/531,006 is incorporated herein by reference.

FIELD OF THE DISCLOSURE

The embodiments presented in this disclosure generally relate to Lithographic printing and more particularly to direct imaging of wet Lithographic printing plates.

BACKGROUND

Lithographic printing is based on the principle that oil and water do not mix. A lithographic printing plate has non-image areas which absorb water (hydrophilic areas) and image areas which repel water (hydrophobic areas). For wet offset lithographic printing, the plate is first dampened by water so that the ink is applied to the wetted printing plate to form the image. The ink, which is inherently oily, is rejected by the wet areas and adheres to the image areas. The ink from the inked printing plate is then transferred or "offset" to a rubber blanket. Next, the image on the blanket is transferred to the substrate, mostly paper, to produce the printed product.

The process of imaging the lithographic printing plate usually involves wet processing and use of unhealthy chemicals and high cost imaging devices such as Computer to Plate (CTP). There is a need for a printing member that can be imaged on demand at the print shop in a simple chemistry-free process and using an inexpensive imaging engine like inkjet printers.

The application of inkjet printers for producing offset printing plates is an issue which has attracted digital printing field developers due to its potential for inexpensive imaging hardware and workflow. In many applications utilizing inkjet printer engines, the solutions employ the use of special inkjet fluid instead of original inks.

A few examples include Japanese patent JP56105960 issued to Nakayama et al. which describes the use of heat activated hardening material in oleophilic inkjet inks, forming the image areas on hydrophilic substrates. The substrate may or may not be coated. Also, U.S. Pat. No. 4,833,486 by Zerillo utilizes a hydrophobic wax based inkjet ink. U.S. Pat. No. 5,738,013 by Kellet describes an ink-jet plate-making process involving the use of reactive inkjet ink, which is bonded to the litho plate by a chemical reaction activated by radiant energy. U.S. Pat. No. 5,820,932 by Hallman et. al describes a variety of reactive inks and processes. U.S. Pat. No. 6,184,267 by Osawa et al. describes oil-based ink for preparing printing plate. U.S. application 2006/0223006 by Shimada et al. describes reactive inkjet composition, being jetting on to the reactive coating forming ink accepting image.

Still, other examples include U.S. Pat. No. 5,495,803 which describes a solid or phase change type of ink jet printing to form a photomask for a printing plate.

U.S. Pat. No. 5,511,477 discloses a method for the production of photopolymeric relief-type printing plates comprising the formation of a positive or a negative image on a substrate by ink jet printing with a photopolymeric ink composition, optionally preheated to a temperature of about 30.degree.-260.degree. C., and subjecting the resulting printed substrate to UV radiation, thereby curing the ink composition forming the image.

U.S. Pat. No. 5,312,654 discloses a method for making lithographic printing plates comprising the formation of an image on a substrate having an ink absorbing layer and a hydrophilized layer between the substrate and the absorbing layer by ink jet printing using a photopolymerizable ink composition, and exposing it to an actinic light in the wavelength region with which said ink composition is sensitized to cure the image.

In U.S. Pat. No. 6,455,132 a fluid composition is described comprising a copolymer, having a plurality of tertiary amine sites selected from the group consisting of polyacrylates, polyamides, styrenated polyacrylates and polyurethanes, which can be applied by an ink jet printing apparatus.

In EP-A 1157825 a method is disclosed for the preparation of a lithographic printing plate, comprising dispensing information-wise by means of ink jet printing droplets of a fluid onto a surface of a lithographic receiver, characterized in that said fluid contains an oleophilizing agent having in its chemical structure a phosphorous containing group capable of reacting with said surface of said lithographic receiver.

Typical applications that provide imaging with inkjet printers require special inkjet printers. For example, such special inkjet printers include solvent base or wax thermal jet printers. These printers must be suitable for the special solvent, photo-curable or hot melt inks that are utilized. These specialized printers are considerably more expensive than standard inkjet printers and are not as environmentally friendly as the inkjet printers that utilize water based inks. An additional disadvantage of such special inkjet printers is that chemical post-processing needs to be performed for such typical applications.

Therefore, the use of water base inkjets for the imaging of offset plates is generally a more attractive solution from economical and ecological points of view.

Additional references related to this field of art include Szumla, DeBoer et al., Eastman Kodak (U.S. Pat. No. 6,758, 140 and application No 20040051768), Figov et al., Creo IL (U.S. Pat. No. 7,044,053) and Porat et al., VIM Technologies Ltd. (U.S. Pat. No. 8,062,720). These references describe direct inkjet printer image-able lithographic plates which can be imaged using standard printers and standard water based pigment ink. Such plates do not require chemical development but rather, simply require baking of the imaged plates at temperatures of about 130-150 C prior to installing on the printing plates. These technologies require special baking system, which increase the investment in plate imaging equipment and add post imaging operation and press-ready time.

SUMMARY

Exemplary embodiments of novel inkjet fluid for novel inkjet plate imaging systems are disclosed. In addition, a method for creating an imaged plate for printing that incorporates embodiments of the inkjet fluid are also presented. The embodiments disclosed herein resolve the above-listed needs by allowing the use of standard printers, waterbased ink and provide ready for press plates right after inkjet printer without any need for post-processing or baking.

Exemplary waterbase inkjet fluid or ink, as well as exemplary methods of producing ready to press direct inkjet image-able lithographic printing plates utilizing such fluids or ink are presented. The waterbase inkjet fluids can be jetted onto the suitable lithographic plate and provide a ready for press printing plate. This fluid is suitable for standard inkjet printers and, by the addition of a colorant, such as a pigment and/or dye, can also be used as standard printing ink and so to keep the printer suitable for its standard application.

An exemplary embodiment may use an inkjet fluid that is sensitive to pH in order to overcome the need for baking. Such an exemplary fluid may comprise polymer, which is soluble in an alkaline aqueous media and is resistant to neutral or acidic aqueous media in that the polymer will not readily dissolve or be broken down in the presence of, or when in contact with, a neutral or acidic aqueous media. A media is defined as a solution, liquid or fluid to which the image produced by the inkjet fluid may be exposed.

The novel fluid can be loaded into an inkjet printer instead of loading the waterbase inkjet ink that is commonly utilized, and can print over a commercial lithographic printing plate having an hydrophilic coating. Exemplary hydrophilic coating layers may comprise hydrophilic polymers and silica or/and alumina. Exemplary printing plates that can be imaged by this fluid can be VIM JT-A direct inkjet image-able aluminum plate supplied by VIM Technologies Ltd., Israel.

The foregoing summary is not intended to summarize each potential embodiment or every aspect of the present invention, and other features and advantages of the present invention will become apparent upon reading the following detailed description of the embodiments with the accompanying drawings and appended claims.

Furthermore, although specific exemplary embodiments are described in detail to illustrate the inventive concepts to a person skilled in the art, such embodiments can be modified to various modifications and alternative forms. Accordingly, the figures and written description are not intended to limit the scope of the inventive concepts in any manner.

BRIEF DESCRIPTION OF THE DRAWINGS

FIG. 1 is a sectional view of a printing plate suitable for use with exemplary embodiment of the inkjet fluid.

DETAILED DESCRIPTION OF VARIOUS EMBODIMENTS

In the following detailed description, numerous specific details are set forth in order to provide a thorough understanding of the invention. However it will be understood by those of ordinary skill in the art that the embodiments of present invention may be practiced without these specific details. In other instances, well-known methods, procedures and components have not been described in detail so as not to obscure the present invention.

Embodiments of the present disclosure are directed to a waterbased inkjet fluid and a method of producing a lithographic printing member by direct imaging using inkjet printing. The imaging of the printing member may be performed by selectively depositing inkjet fluid from a standard inkjet printer.

According to some embodiments of the present disclosure, the imaged printing member may be a lithographic printing plate suitable for conventional wet printing systems, such as VIM JT-A direct inkjet image-able aluminum plate, for example. According to other embodiments, the printing member may be applied directly onto a lithograph printing system. It should be noted that the terms "printing member" and "printing plate" are used interchangeably throughout the specification and claims and, such terms refer to any type of printing member or surface capable of recording an image defined by regions exhibiting different affinities for ink. The term "hydrophilic" is used throughout the specification and claims to describe the affinity of a surface for water to prevent ink from adhering thereto. Such water may include additives like fountain solution, anti-foam, alcohol, etc. The term "oleophilic" is used throughout the specification and claims to describe the affinity of a surface for ink to adhere thereto. The terms "waterbased" and "aqueous" are used interchangeably throughout the specification and claims and refer to any type of inkjet ink, inkjet fluid or they components to specify that they are prepared from a water base.

According to embodiments of the disclosure, the printing member may have a base substrate and a hydrophilic coating. Exemplary hydrophilic coating layer may comprise hydrophilic polymers and silica or/and alumina. The coating is able to accept the image, which is formed by inkjet printing of a waterbased fluid or ink. This image has hydrophobic surface. When the plate is installed on an offset press, the plate is first dampened with water. The water covers the hydrophilic coating but does not cover imaged areas, which are hydrophobic. Then the offset ink is applied to the wetted printing plate to form the image. The offset ink, which is inherently oily, is rejected by the water wet areas and adheres to the image areas. This image accepts the offset ink while the hydrophilic coating accepts water and, being wet does not accept the offset ink.

Waterbase inkjet fluid, or ink used for imaging a printing plate, needs to have two opposite responses to water. As waterbase inkjet ink, the fluid has to be soluble in water. While on a wet lithographic press machine, the image over the printing plate needs to resist the dampened water. Usually the image formed with standard waterbase inkjet ink is washed off from plate with dampening the plate with water and therefore, such plate does not work. In some plate embodiments described in the Background section, it is possible to use standard pigment based ink to print the image, for example Epson UltraChrome K3 or HDR ink. But, such a plate with the such ink requires a further baking process—heating the plate at 130-150 deg C. for a duration of 2-6 minutes. If the baking process is not performed, the image does not stay on plate and will be washed off of the plate after a short run.

The embodiments of inkjet fluid or ink presented herein utilize a polymer additive which is soluble in alkali aqueous media and resistant to neutral or acidic aqueous media. Advantageously, such an additive operates to increase the resistance of the image from being washed out on a wet press machine. Therefore a plate that is imaged with this novel inkjet fluid does not require baking and may be used on a press immediately after the completion of the imaging process by the inkjet printer.

Such novel fluid can contain a volume of material which provides water alkali properties and is suitable to raise the pH level above 8. Many salts and hydroxides can be used, for example sodium hydroxide, potassium hydroxide, ammonium hydroxide, sodium carbonate, sodium bicarbonate and others.

Further, in order to prevent clogging, drying out or blocking of the inkjet head nozzles, the fluid may comprise humectant cosolvents. Examples of suitable humectants cosolvents include: ethylene glycol, diethylene glycol, triethylene glycol, propylene glycol, dipropylene glycol, tripropylene glycol, polyethylene glycol with a molecular weight of 2000 or less, 1,3-propylene glycol, isopropylene glycol, isobutylene glycol, 1,4-butanediol, 1,3-butanediol, 1,5-pentanediol, 1,6-hexanediol, glycerol, meso-erythritol, pentaerythritol, propylene glycol monomethyl ether acetate, dipropylene glycol (mono)methyl ether acetate, ethylene glycol monobuthyl ether acetate.

Furthermore, it is recommended that an inkjet printer should be at least be calibrated in correspondence to the fluid, the type of the printing plate and the required resolution, dots per inch (DPI). An exemplary calibration process is disclosed in the PCT application which was published as WO2011061738(A1) "Direct Inkjet Imaging Lithographic Plates, Method for Imaging and Pre-Press Treatment", which is herein incorporated by reference. It is also important to use proper lithographic plates dedicated for imaging on water-based pigmented ink. Examples of such commercial printing plates can be VIM JT-A direct inkjet image-able aluminum plate supplied by VIM Technologies Ltd., Israel. Other printing plate can be PolyJet direct inkjet image-able polyester plate supplied by Technova Imaging Systems Ltd., India, etc. Additional examples of suitable lithographic plates are described in VIM Technologies patent U.S. Pat. No. 8,062,720.

Non-limiting examples for polymers that can be used in the novel fluid can comprise natural occurring resins and their modifications, like those derived from abietic acid and known as Rosin esters. For instance, the reaction product created by combining the rosin esters with maleic anhydride and fumaric acid can be included in the novel inkjet fluid. The maleic and fumaric derivatives of the rosin ester are soluble in a wide range of solvents and some of these are also soluble in water in the form of the neutralized product with alkali or ammonia. Such polymers can be used as components of various embodiments of the inkjet fluid or ink. In a particular embodiment of the inkjet fluid, the modified rosin ester combined into the inkjet fluid has an acid number in the range 50-250 or carboxyl equivalent weight of 1120 to 224.

Synthetic low molecular weight resins which also may be useful for some embodiments of the novel fluid are the copolymers of acrylic and methacrylic acids with other co-monomers such as acrylic esters and other vinyl monomers, co-polymers of maleic anhydride with other vinyl polymers such as vinyl ethers (e.g., Gantrez resins by ISP), styrene (products of Sartomer/Cray-valley with different ratios of maleic anhydride to styrene), and the adducts of maleic anhydride with other polymers. Maleic anhydride is a common modifier to many thermoplastic polymers and resins. It is combined with other polymers via a Diels-Alder addition to other double bonds such as the adducts of MA with poly (butadiene) (e.g., Ricoh resins, now a part of Sartomer) or the free radical attachment of MA to saturated polymers including poly-olefins etc. Some of those materials also can be used as components of exemplary embodiments of the inkjet fluid or ink.

One of the properties of the novel fluid is the ability of an anionic polymer to be soluble in a slightly alkaline solution and to be insoluble and low swelling polymer at lower pH solutions. In addition, the polymer should have low molecular weight, low viscosity and good compatibility with the anionic latex polymers and other components of the ink composition.

Shellac is an example of a naturally occurring polymer and it is based on the exudates of an insect. Chemically, shellac is a complex of natural co-polyester with some free carboxy groups. Some of the major building blocks of the polymer are the polyhydroxy carboxylic acids. It is soluble in slightly basic solution (pH 8.5-9) and insoluble at a lower pH. It forms unexpected very low viscosity solutions at high solids content of up to 50%. Low viscosity is an important feature when dealing with ink jet printers so as to alleviate problems due to clogging or blockage.

By adding shellac as a component of an exemplary inkjet fluid or standard inkjet ink, a dramatic increase of adherence of the image to the plate, even when being used on the press. Thus, by adding shellac to the inkjet fluid or standard inkjet it, it advantageously allows for the elimination of applying a baking process after the image is placed onto the plate by an inkjet printer. In exemplary embodiments of the inkjet fluid, volumes of shellac may be added to obtain concentrations of shellac in the range of 0.3 to 30%, as a non-limiting example.

Alkali aqueous shellac solution can be used as separate fluid for imaging of the plate on inkjet printer. It can be mixed with other components, such as humectants, colorants, dyes, pigments, anionic resin emulsions, polymeric binders, surfactants, biocides, anti-corrosion additives.

Shellac solution also can be added to standard inkjet ink to provide it ability of imaging a plate without the need of a baking process.

Furthermore, in some embodiments, the inkjet fluid can be formulated in such manner that it will have a standard color performance and can be used as pigment ink for standard inkjet printing applications. In such embodiments, the inkjet printer will not lose it functionality and can be used for standard inkjet printing jobs as well as for imaging lithographic plates. This is another advantage in that a dedicated inkjet printer is not required only for plate imaging, but rather, it can be utilized for multiple applications.

It is also anticipated that the novel inkjet fluid can be combined or mixed with standard inkjet fluid. Similarly, various elements described in embodiments of the inkjet fluid can be added to standard inkjet fluid. For instance, as a non-limiting example, the shellac can be added to standard or aqueous inkjet, as well as other elements described herein.

It should be clear that such fluid or ink can be used also with baking of plates, in this case imaged and baked plates provide considerably increased printing run length.

Lithographic Printing Member:

The disclosed novel inkjet fluid or ink can be used with a suitable lithographic printing member. Thus, the novel inkjet fluid may be loaded into an inkjet printer and used to create an imaged printing plate. Such a suitable lithographic printing members typically include a hydrophilic coating which accepts inkjet fluid and provides good quality imaging when imaged by an inkjet printer. Further, such suitable lithographic printing members will accept water in non-imaged areas and then repel offset ink which is applied by the offset printing press. Several commercial plates that are suitable lithographic printer members exist. A few non-limiting examples include: VIM JT-A direct inkjet image-able aluminum plate supplied by VIM Technologies Ltd., Israel; or PolyJet direct inkjet image-able polyester plate supplied by Technova Imaging Systems Ltd., India, etc. Additional examples of suitable lithographic plates are described in VIM Technologies patent U.S. Pat. No. 8,062,720.

Exemplary printing members may have a base substrate and a coating that comprises hydrophilic polymer and colloidal silica covering the base substrate. FIG. 1 is a sectional view of a printing plate suitable for use with exemplary embodiment of the inkjet fluid. An exemplary printing plate 10 may include a substrate 20 and a hydrophilic coating layer 30. In some applications, the substrate 20 may be aluminum, for example grained aluminum. Alternatively, substrate 20 may include a self supporting polymer such as polyester (PET). Optionally, a primer layer (not shown) may be added between substrate 20 and coating 30. The primer layer may include a terpolymer. Non-limiting examples of terpolymers may include polyvinyl alcohol, polyvinyl acetate, polyvinyl butyral and any combination thereof. The primer layer may also include a matting agent, such as amorphous silica, alumina or kaolin.

Coating layer 30 may be applied onto substrate 20 by any suitable method as known in the art, for example, wire wound rod coating, roll coating, spin coating or extrusion hopper coating, or the like. Hydrophilic coating layer 30 may include a mixture of colloidal particles and a hydrophilic polymer such as polyvinyl alcohol. The amount of colloidal particles in the coating mixture may vary from about 10 percent by weight to about 45 percent by weight. The amount of hydrophilic polymer in the coating mixture may vary from about 15 percent by weight to about 30 percent by weight.

Coating 30 may further include a hardening agent such as glyoxal, gluteraldehyde and/or melamine-formaldehyde resin our other types can be used. The amount of cross-linking agent needed in the coating layer may vary from about 0.1% by weight to about 20% by weight.

The coating layer may also include a matting agent to increase the roughness of the coating and therefore aid in the absorption of water used in wet lithographic systems. In some embodiments, the particle size of the matting agent may be between around 1 to around 20 microns. Matting agents such as amorphous silica, alumina and kaolin may be used. Other materials may be added to the coating layer, such as wetting agents, antifoam agents, thickeners, colorants, dyes, pigments, hydrophilic resins, fumed silica, colloidal particles.

Exemplary colloidal particles can be colloidal silica, colloidal alumina, etc.

The hydrophilic polymer may be a polyvinyl alcohol or one its derivatives. A non-exhaustive list of suitable hydrophilic polymers may include poly(vinyl alcohol), poly(vinyl pyrrolidone), poly(acrylic acid), polyacrylamid, polyethylenglycol, arabic gum and polyethylenimine. According to other embodiments, other hydrophilic polymers may be used. The amount of hydrophilic polymer in the coating mixture may vary from about 15 percent by weight to about percent by weight.

Dry coating weight of hydrophilic layer may be between 2 to 15 g/(sq. m). More specifically it may be between 2 to 6 g/(sq. m).

Inkjet Printing Conditions

When applying the various described embodiments of the inkjet fluid or ink, suitable inkjet printing parameters for the exemplary inkjet fluid should utilized. In one particular application, inkjet fluid or ink quantity per printed surface (IPS) should be less than 10 nl/(sq. mm). In other embodiments, the IPS may be in the range of 2 to 10 nl per mm2. More particularly, in other embodiment, the IPS may be in the range of 4 to 7 nl per mm2.

IPS, in this case, is defined by inkjet printer parameters such as Printing Resolution in the X and Y directions PR(X) and PR(Y) in dpi, Drop Volume (DV) in picoliters and Ink Reduction factor (IR) in %:

$$IPS=PR(X) \times PR(Y) \times DV \times IR/(25.4\ 2 \times 105)$$

A person of ordinary skill in the art will understand that these parameters are handled by the Raster Image Processor RIP software typically used for imaging the plates. A reader who wishes to read more is invited to read the PCT international publication WO2011/061738(A1).

If IPS is less than 2 nl/(sq. mm), poor image quality of offset printing impressions will be obtained. This poor image quality is realized due to a non-complete covering (i.e., a solid 100%) of image areas. When IPS is higher than 10 nl/(sq. mm), then the image may be destroyed during printing by washing some image areas during the printing process on the press.

More specifically, volume of the inkjet ink IPS in solid areas of the image may be in the range of 4 to 7 (nl/mm2).

Example 1

Preparation of Inkjet Fluid Base

One embodiment of the inkjet fluid base is prepared by mixing of following basic composition:

| Weight % | Ingredients of inkjet fluid base |
|---|---|
| 79.2 | Water |
| 9 | Shellac, sold under name R-49 Refined Bleached Shellac by Mantrose-Haeuser Co., USA. |
| 1.8 | Sodium Carbonate |
| 10 | Glycerol |

When these ingredients are combined, the result is a transparent brownish low viscose fluid.

The inkjet fluid according to this embodiment may be installed or used in conjunction with an Epson Stylus Pro 4000 printer, as a non-limiting example.

Example 2

Preparation of Inkjet Ink

One embodiment of the inkjet ink can be prepared by mixing of following ingredients or compositions in the approximate proportions as listed below:

| Weight % | Ingredients of ink |
|---|---|
| 35.2 | Water |
| 4 | Shellac, sold under name R-49 Refined Bleached Shellac by Mantrose-Haeuser Co., USA. |
| 0.8 | Sodium Carbonate |
| 22 | Epson Ultrachrome HDR Cyan ink |
| 38 | Epson Ultrachrome HDR Light Cyan ink |

The resulting ink may be installed in or used in conjunction with an Epson Stylus Pro 4000 printer and Epson Stylus Pro 9900 printer as non-limiting examples.

This exemplary embodiment of the inkjet fluid or ink may be applied to a lithographic plate that includes an inkjet accepting hydrophilic layer, but may be also used as Light Cyan ink for standard printing applications. When utilized for standard printing operations, this exemplary ink, when printed on Epson Photo paper, results in similar performance to standard Epson Light Cyan ink.

Example 3

Preparation of Inkjet Ink

The fluid obtained in Example 1 was mixed with Cone-Color Cyan and Light Cyan pigment inks in following proportions:

| Weight % | Ingredients of ink |
|---|---|
| 44 | water |
| 5 | Shellac, sold under name R-49 Refined Bleached Shellac by Mantrose-Haeuser Co., USA. |
| 1 | Sodium Carbonate |
| 27.5 | ConeColor Cyan ink sold by INKJET MALL, USA |
| 22.5 | ConeColor Light Cyan ink sold by INKJET MALL, USA |

This resulting ink may be installed in or operate in conjunction with an Epson Stylus Pro 4000 printer as a non-limiting example.

This exemplary embodiment of the inkjet fluid or the ink may be applied to a lithographic plate with an inkjet accepting hydrophilic layer, but may be also used as Light Cyan ink for standard printing applications.

Example 4

Printing Test

The inkjet fluid of Example 1 was printed onto VIM JT-A direct inkjet image-able aluminum plate supplied by VIM Technologies Ltd. utilizing an Epson Stylus Pro 4000 and a Wasatch SoftRIP SP RIP for plate imaging. The following printing conditions were installed in the RIP:
Resolution 720×1440 dpi
Drop Volume 3.5 pcl
Ink reduction 100%
Calculated ink quantity per printed surface (IPS)—5.6 nl/sq.m No baking was applied to the imaged plate. The printed or imaged plate was installed on an Heidelberg GTO-52 offset plate. Using Huber Rapida Black ink and 6% Prisco 142-126 fountain solution, 2000 impressions were printed with a standard quality and without any image deterioration.

Example 5

Printing Test

The inkjet ink of Example 2 was printed onto VIM JT-A direct inkjet image-able aluminum plate supplied by VIM Technologies Ltd., Israel utilizing an Epson Stylus Pro 9900 and Wasatch SoftRIP SP RIP for plate imaging. The following printing conditions were installed in RIP:
Resolution 1440×1440 dpi
Drop Volume 3.5 pcl
Ink reduction 53%
Calculated ink quantity per printed surface (IPS)—5.96 nl/sq.m Directly after imaging the plate with the inkjet printer, the plate was installed on an Heidelberg GTO-52 offset plate. Using Huber Rapida Black ink and 6% Prisco 142-126 fountain solution, 10,000 impressions were printed with a standard quality and without any image deterioration.

Example 6

Printing Test

As a comparison test, the test conditions utilized in Example 5 were followed with the exception that the embodiment of the inkjet ink of Example 2 was replaced with Epson Ultrachrome HDR Cyan ink. The same type plate was then imaged using the same inkjet printer as used in Example 5.

Directly after imaging the plate with the inkjet printer, the plate was installed on an Heidelberg GTO-52 offset plate under the same conditions as Example 5. It was observed that the image was washed out from plate shortly after printing was commenced.

Example 7

Printing Test

As another comparison test, the test conditions utilized in Example 5 were followed with the exception that the embodiment of the inkjet ink of Example 2 was replaced with Epson Ultrachrome HDR Light Cyan ink was used for plate imaging.

Directly after imaging the plate with the inkjet printer, the plate was installed on an Heidelberg GTO-52 offset plate under same conditions as Example 5. It was observed that the image was washed out from plate right shortly after printing commenced.

Example 8

Printing Test

As another comparison test, the test conditions utilized in Example 6 were followed with the exception that prior to installing the plate onto the press but after imaging, the imaged plate was baked at 150 deg C. for 6 minutes. It was observed that 10,000 impressions were printed with a standard quality and without any image deterioration.

Example 9

Printing Test

The Inkjet ink of Example 2 was applied to a PolyJet direct inkjet image-able polyester plate supplied by Technova Imaging Systems Ltd., India utilizing an Epson Stylus Pro 4000 and Wasatch SoftRIP SP RIP for plate imaging. The following printing conditions were installed in RIP:
Resolution 720×1440 dpi
Drop Volume 3.5 pcl
Ink reduction 100%
Calculated ink quantity per printed surface (IPS)—5.6 nl/(sq. m)

After the plate was imaged, and without baking the imaged plate, the plate was installed on an Heidelberg GTO-52 offset plate. Using Huber Rapida Black ink and 6% Prisco 142-126 fountain solution, it was observed that 1000 impressions were printed without any image deterioration.

Example 10

Printing Test

The inkjet ink of Example 3 was applied to a VIM JT-A direct inkjet image-able aluminum plate supplied by VIM Technologies Ltd., Israel utilizing an Epson Stylus Pro 4000 and Wasatch SoftRIP SP RIP for plate imaging. The following printing conditions were installed in RIP:
Resolution 720×1440 dpi
Drop Volume 3.5 pcl
Ink reduction 100%
Calculated ink quantity per printed surface (IPS)—5.6 nl/sq.m After the plate was imaged, and without baking the imaged plate, the plate was installed on an Heidelberg GTO-52 offset plate. Using Huber Rapida Black ink and 6% Prisco 142-126 fountain solution, it was observed that 4000 impressions printed without any image deterioration.

The present disclosure has presented detailed descriptions of various embodiments of an inkjet fluid that are provided by way of example and are not intended to limit the scope of the invention. The described embodiments comprise different features, not all of which are required in all embodiments of the invention. Some of the described embodiments utilize only some of the features or possible combinations of the features. Many other ramification and variations are possible within the teaching of the embodiments comprising different combinations of features noted in the described embodiments.

It will be appreciated by persons skilled in the art that the present invention is not limited by what has been particularly shown and described herein above. Rather the scope of the invention is defined by the claims that follow.

What is claimed is:

1. A method of producing and printing with a press-ready lithographic printing plate, the method comprising:
    loading an inkjet printer with a water-based fluid that comprises a polymer (i) soluble in an alkaline aqueous medium and (ii) insoluble in neutral or acidic aqueous media;
    using the inkjet printer to deposit the water-based fluid onto a hydrophilic layer of a blank printing plate in an image pattern, whereby the water-based fluid adheres to the hydrophilic layer without baking to form image areas thereon, thereby producing the press-ready lithographic printing plate;
    installing the press-ready lithographic printing plate onto a printing press without conducting a post-imaging treatment on the plate; and
    printing with the press-ready lithographic printing plate by successively applying an aqueous solution followed by ink to the printing plate and transferring the ink to a recording medium.

2. The method of claim 1, wherein the polymer comprises anionic naturally occurring resins.

3. The method of claim 1, wherein the polymer comprises (i) copolymers of acrylic and methacrylic acids with other co-monomers comprising at least one of acrylic esters or other vinyl monomers, (ii) copolymers of maleic anhydride with other vinyl polymers comprising at least one of vinyl ethers or styrene, or (iii) adducts of maleic anhydride with other polymers.

4. The method of claim 3, wherein the water-based fluid further comprises a colorant.

5. The method of claim 1, wherein the polymer comprises shellac.

6. The method of claim 5, wherein a concentration of shellac is 0.3 to 30%.

7. The method of claim 1, wherein the polymer comprises a naturally occurring resin with an anionic modification.

8. The method of claim 7, wherein the polymer comprises a rosin ester modified with maleic anhydride or fumaric acid.

9. The method of claim 8, wherein the modified rosin ester is further modified with a modifier selected from the group consisting of pentaerhytrytol, glycerol, polyethleneglycol, triethyleneglycol, and ethylene glycol.

10. The method of claim 8, wherein the modified rosin ester has an acid number in the range 50-250 or carboxyl equivalent weight of 1120 to 224.

11. The method of claim 7 wherein the polymer comprises a dimerized or polymerized rosin.

12. The method of claim 7, wherein the polymer comprises a hydrogenated or partially hydrogenated rosin.

13. The method of claim 12, wherein the water-based fluid comprises an element selected from the group consisting of humoctant co-solvent, polymeric binders, surfactants, biocides, and anti-corrosion additives.

14. The method of claim 1, wherein the water-based fluid is mixed with an aqueous inkjet ink.

15. The method of claim 1, wherein the hydrophilic layer comprises hydrophilic polymers and at least one of silica or alumina.

16. The method of claim 15, wherein the hydrophilic layer comprises silica, and the silica comprises colloidal silica.

17. The method of claim 15, wherein the hydrophilic layer comprises silica, and the silica comprises acidic colloidal silica.

18. The method of claim 1, further comprising configuring the inkjet printer such that a volume of the water-based fluid to be injected over 1 $mm^2$ of solid image area is in the range of 2 and 10 nl.

19. The method of claim 1, further comprising configuring the inkjet printer such that a volume of the water-based fluid to be injected over 1 $mm^2$ of solid image area is in the range of 4 to 7 nl.

* * * * *